United States Patent
Auracher

[11] 3,980,392
[45] Sept. 14, 1976

[54] MODE TRANSDUCER FOR OPTICAL WAVE GUIDES

[75] Inventor: Franz Auracher, Munich, Germany

[73] Assignee: Siemens Aktiengesellschaft, Berlin & Munich, Germany

[22] Filed: May 1, 1975

[21] Appl. No.: 573,554

[30] Foreign Application Priority Data
May 2, 1974 Germany.......................... 2421337

[52] U.S. Cl. ...................... 350/96 WG; 350/96 C
[51] Int. Cl.² .......................................... G02B 5/14
[58] Field of Search ............... 350/96 WG, 96 C

[56] References Cited
UNITED STATES PATENTS
3,610,727  10/1971  Ulrich ........................ 350/96 WG
3,617,109  11/1971  Tien .......................... 350/96 WG
3,806,226  4/1974   Tien .......................... 350/96 WG OTHER PUBLICATIONS
Yajima "Dielectric Thin-Film Optical Branching Waveguide" *Applied Physics Letters* vol. 22, No. 12, June 1973, pp. 647–649.

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

A mode transducer for use with a pair of optical wave guides for converting modes of different orders but of the same polarization to enable coupling between a first and second wave guide characterized by a coupling taper with a coupling structure arranged between the first and second wave guides with the coupling taper having an input thickness and a output thickness with the ratio of the opening angle of the mode at the input and the output of the taper being equal to the square of the ratio of the input and output thickness. In order to convert more than one mode for coupling between the first and second wave guides, the mode transducer may include a plurality of serially arranged tapers with each taper having a coupling structure and the wave guide receiving the coupled modes includes a segment of electro-optical material for each taper so that the phase of the coupled modes can be selectively changed to enable superimposition thereof.

4 Claims, 4 Drawing Figures

MODE TRANSDUCER FOR OPTICAL WAVE GUIDES

BACKGROUND OF THE INVENTION

1. Field of the Invention

The present invention relates to a mode transducer for converting modes of different orders but of the same polarization to enable coupling between a pair of optical wave guides.

2. Prior Art

In optical transmission systems, it would be desirable to combine multi-mode and monomode systems. It is possible to combine in the certral control a plurality of multi-mode systems each having small band widths to form a monomode or single mode system having a large band width and then to transmit the combined optical systems over long distances to another central control where the monomode system is split up into a plurality of narrow band multi-mode systems. It is also desirable to have available a multi-mode system which can be connected to integrated optical components. Since integrated optical components are considerably easier to produce in either a monomode design or for a few lower modes and since many components can be fundamentally designed only for monomode operation, transducers are required to convert a plurality of modes to one or more than one low mode and vice versa.

Both transducers, which convert a specific mode to another mode or which either pass or block one or more than one mode are desirable for filter purposes. A mode filter of this type can for example be used to separate the higher modes from the lower modes of a multi-mode fiber. The higher modes may be used to supply short subscriber lines and the lower modes which have both lower attenuation and transit time distorsions are transmitted over the longer distances.

The separation of the individual modes by means of mode filters, also, facilitates the compensation of transit time differences and attenuation differences of the individual modes in the light wave guides which have a low mode conversion so that a substantial large band width can be achieved.

Also, in many optical components such as parametric amplifiers and frequency doublers, generally anisotropic wave guides are coupled and each of these wave guides has a different mode being propagated therein. To obtain a phase matching between the different modes, a mode transducer is required.

SUMMARY OF THE INVENTION

The present invention is directed to providing a mode transducer for converting modes of different orders but of the same polarization during coupling between a pair of optical wave guides. The mode transducer of the present invention will operate by separating individual modes which have different field distributions from one another, by converting the field distribution of a mode which is to be converted to the field distribution of the desired mode, and by superimposing the converted modes which have the correct phase. If prior to superimposition the original modes had a fixed phase relationship to each other, the phases of the individual converted modes must also be corrected in such a manner that all of the converted modes are constructively superimposed.

To accomplish this, the mode transducer includes at least one coupling taper with a coupling structure arranged between the pair of optical wave guides, said coupling taper having an input thickness and an output thickness with the ratio of the acceptance angle of the light at the input and the output of the taper being equal to the square of the ratio of the input thickness and the output thickness. In particular the relationship is according to the equation:

$$\frac{\Omega_1}{\Omega_2} = \left(\frac{W_2}{W_1}\right)^2$$

where $\Omega_1$ = input opening angle; $\Omega_2$ = output opening angle; $W_1$ is input thickness of the taper; and $W_2$ is the output thickness of the taper.

Preferably to enable an equal phase superimposition of the converted modes coupled to the wave guide, the wave in which the converted modes are coupled is provided with at least one segment of an electro-optical material with electrodes for applying a field thereto so that when an electrical field is applied, the index of refraction in the segment of the electro-optical material is changed to shift the phase of the mode therein.

To couple a plurality of modes in one wave guide to one or more lower modes in the other wave guide, the transducer can include a series of integrally formed tapers each having a separate coupling structure. Preferably, either the wave guide into which the converted modes are coupled is provided with segments of electro-optical material with each segment having separate electrodes for applying electrical field thereto or the coupling structures are direct couplings having an electro-optical segment with electrodes for applying a field thereto so that the phase of the coupled modes can be selectively shifted to allow superimposition.

DESCRIPTION OF THE PREFERRED EMBODIMENTS

Figure 1:
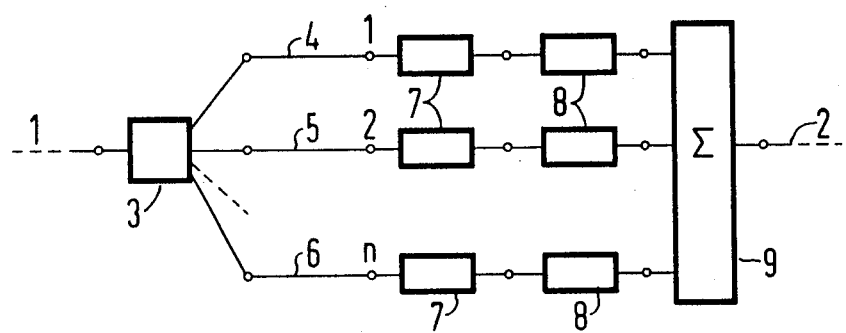
FIG. 1 is a schematic construction of a transmission system with mode transducers in accordance with the invention.

The principles of the present invention are particularly useful for providing a mode transducer which is particularly useful in an optical transmission system schematically illustrated in FIG. 1. The system has a multi-mode fiber 1, a monomode or single mode fiber 2 with a plurality of elements disposed inbetween. As illustrated, the multi-mode fiber 1, which has modes of different orders but of the same polarization propagated therein, is connected to a mode filter 3, which considered in the direction of the wave propagation separates the different modes of the light waves into a plurality of fibers 4, 5 and 6 which fibers carry a mode designated 1, 2, . . . n. As illustrated, each of these fibers 4, 5 and 6 extends to a separate mode transducer 7, which for example can convert a mode $i$ to the fundamental mode $l$, and which are constructed in accordance with the present invention. Each of the transducers 7 has a phase correcting element 8 associated therewith which elements 8 are required to correct the phase prior to obtaining a correct phase superimposition of the converted modes. The superimposition itself takes place in a superimposition element 9 so that light waves of a single mode, which are suitable for transmission over long distances, are available in an output such as the monomode or single mode fiber 2.

In accordance with the present invention, the mode transducer can convert one or more specific modes which are propagated in a light wave guide 11 into one or more specific modes which are coupled to a second light wave guide 14. As illustrated, the light wave guide 11 is arranged as either a layer or rectangular wave guide on a substrate 10. The transducer has at least one taper 13 and a suitable coupling structure 12 which coacts to match the phase speed of the modes which are coupled from the wave guide 11 to the wave guide 14. Since various modes in the wave guide also have different phase velocities, energy can only be selectively coupled from one wave guide to the other from one or more modes whose phase velocities or phase speeds are equal to the phase speed of a mode which may propagate in the second optical wave guide.

The phase speeds of a specific mode are dependent upon both the dimensions of the wave guide and the indicies of refraction of the material which will form the wave guide. In order to match the phase speeds of the two modes which are to be coupled, generally a taper and/or a periodic structure is used. The two coupled wave guides 11 and 14 will then, via evanescent or leakage waves, couple only the modes which have approximately the same phase speed in the two wave guides. Such a mode transducer can then convert the mode $i$ to the fundamental mode $l$. If the modes of light being propagated in an optical wave guide have orders of the modes $i = 1, 2, \ldots n$, and if several mode transducers are combined, it is basically possible to convert all of the modes having orders 1 to n into the fundamental mode.

Figure 3:
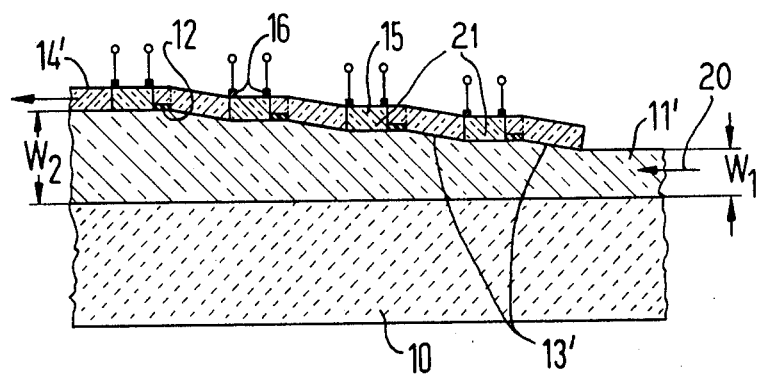
FIGS. 3 and 4 show other exemplary embodiments of mode transducer in accordance with the present invention.

Considered from the point of view of beam optics, the various modes of the light beam have different opening angles to the direction of propagation, and with this opening angle, the light beam is totally reflected on the boundary faces of the optical wave guide in a zig-zag form. The taper 13 will cause a gradual change in the opening angle of the beam until a desired synchronous angle for coupling is achieved. If a plurality of modes of the one wave guide are to be coupled to one or more lower modes of another wave guide, a plurality of tapers arranged in series with each taper having a coupling structure or a continuous or integral taper and coupling structure as illustrated in FIG. 3 can be utilized.

Figure 2:
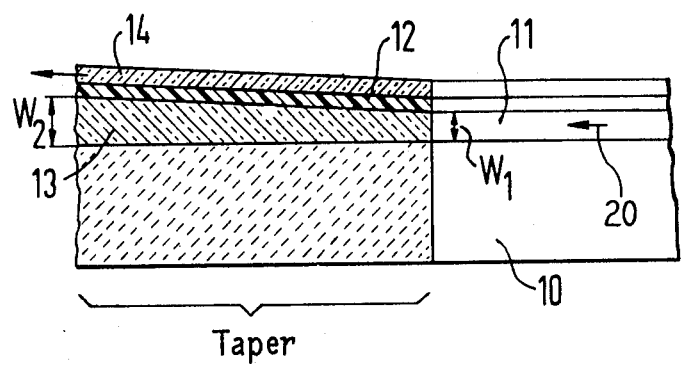
FIG. 2 is a cross-sectional view with portions in elevation for purposes of illustration of a mode transducer in accordance with the present invention.

In the transducer of FIG. 2, if a coherent light distributed between a plurality of modes is propagating in the direction of arrow 20 in the lower or first wave guide 11 and is input coupled into the taper 13, a high mode, which has a large opening angle to the axis of the light beam, is multiply reflected between the boundary faces of the wave guide 11, which has an index of refraction of the wave guide 11 and the substrate 10, which has a lower index of refraction $n_3$, and the upper boundary faces of the wave refraction $n_4$, and the upper boundary faces of the wave guide 11 and the coupling structure such as the layer 12, which has an index of refraction $n_2 > n_3$. As the light enters the taper 13, which may be an integral portion of the wave guide 11, the opening angle of the beam to the axis will be reduced during the reflections until the phase speed of the relevant mode in the lower wave guide 11 agrees with the phase speed of the mode which may be propagated in the upper wave guide 14, for example, the fundamental mode. When this occurs there is coupling of light energy in the upper wave guide 14.

When the index of refraction $n_1$ for the wave guide 14 and $n_3$ of the wave guide 11 and the thickness of the upper wave guide are correctly selected, the beam is conducted onward in the upper wave guide 14 by total reflection. If, on the other hand, a low mode (small opening angle) is excited from the right, the opening angle of the beam is sufficiently reduced even after a few reflections in the taper 13 to the synchronous angle of propagation and thus, a coupling into the upper wave guide is achieved in which the coupled beam is then conducted onward by total reflection. The ratio of the opening angle $\Omega_1$ at the input of the taper 13 and the opening angle at the output $\Omega_2$ is $$\frac{\Omega_1}{\Omega_2} = \left( \frac{W_2}{W_1} \right)^2$$

where $W_1$ is the thickness of the taper at the input and $W_2$ is the thickness of the taper at the output. The maximum opening angle $(\Omega_1)$ max in the lower wave guide 11 which still can be inputcoupled into the upper wave guide 14 is $$(\Omega_1) \text{ max} \approx (\Omega_2) \text{ limit} \left( \frac{W_2}{W_1} \right)^2$$

where $(\Omega_2)$ limit is the opening angle corresponding to the limit or critical angle of total reflection in the upper wave guide 14. It is assumed that $n_1$ is approximately equal to $n_3$ and that the beam optic considerations are valid. However, if the fundamental mode of the lower wave guide 11 is also to be input coupled into the upper wave guide 14, the following conditions must also be fulfilled:

$$\cos (\Omega \text{ limit}) \text{ upper} \leq \frac{n_3}{n_1} \cos \left[ (\Omega \text{ limit}) \text{ lower} \left( \frac{W_1}{W_2} \right)^2 \right]$$

Figure 4:
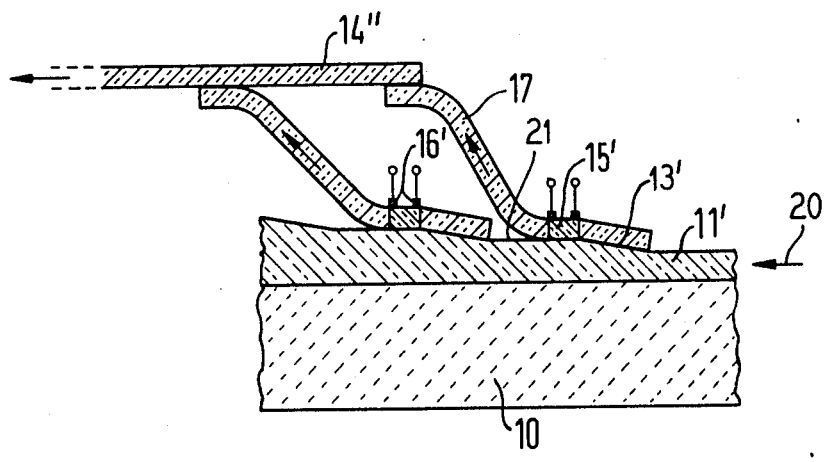

If a plurality of modes having a constant phase relationship to each other are to be converted to one and the same mode, the components or modes converted from the individual modes must be shifted in phase so that they are in phase as they are superimposed one onto the other. Each of the individual modes is output coupled separately by a separate taper and coupling structure. The phase differences between the individual converted components are compensated by wave guide portions which have suitable length, suitable index of refraction and suitable thickness at the region of output coupling. However, since the requirements on the tolerance of the phase correcting wave guide portions is very high, it is more advantageous to externally control the phase delay. FIGS. 3 and 4 illustrate two examples of coupling devices of the present invention which provide external control of the phase delay.

In FIG. 3, a lower or first wave guide 11' which is supported on the substrate 12, has an upper surface provided with a plurality of diverging segments to form a plurality of tapers 13' which diverge in the direction of propagation 20 of the light in the wave guide 11'. Each of the tapes 13' is separated from an adjacent taper by a short flat surface segment 21 which extends substantially parallel to the boundary interface of the wave guide 11' and the substrate 10. Associated with each of the tapers 13' is a coupling structure 12' and disposed on the upper interface is a second or upper wave guide 14'. The upper wave guide 14' is provided with a plurality of segments 15 with one segment positioned on each surface segment 21 and associated with each of the tapers 13' for compensating and correcting the phase differences of the coupled converted modes. Each of the segments 15 is of an electro-optical material and has a pair of individual electrodes 16. When an external voltage is applied to electrode 16, an electrical field is applied on an electro-optical material of segment 15 to change the index of refraction of the segment and to cause a phase shift in a light passing therethrough. Thus, by individually controlling the index of refraction of each of the segments 15, the phase of each of the modes coupled by the separate tapers 13' will be corrected to be in phase for superimposition.

In the coupling device using the transducer of the present invention illustrated in FIG. 4, the lower wave guide 11' is provided with a plurity of integral tapers 13' by having a diverging upper surface separated by the flat surface segments 21. The coupling structure 17 provides individual directional couplers extending from each of the tapers 13' and extending to the upper wave guide 14''. As illustrated, each of the directional couplers is an intermediate wave guide of different lengths and each intermediate wave guide 17 has a segment 15' of electro-optical material which is provided with a pair of electrodes 16'. As in the previously described embodiment, an application of a voltage on electrodes 16' from an outside source will create an electrical field in the segment 15' to change the index of refraction of the electro-optical material and to cause a phase shifting of the light being conducted by the wave guide 17.

Although various minor modifications may be suggested by those versed in the art, it should be understood that I wish to employ within the scope of the patent granted hereon, all such modifications as reasonably and properly come within the scope of my contribution to the art.

I claim:

1. A mode transducer for converting modes of different orders but of the same polarization during coupling between a pair of optical wave guides, comprising a coupling taper with a coupling structure arranged between the pair of wave guides, said coupling taper having an input thickness and an output thickness with the ratio of the opening angle of the light at the input and the output of the taper being equal to the square of the ratio of the input thickness and the output thickness; at least one additional taper and coupling structure said additional taper and coupling structures being arranged in series with the first-mentioned taper and coupling structure so that a plurality of modes in one of the pair of wave guides are sequentially coupled into the other of said pair of wave guides; and the other wave guide including an electrical optical segment for each of the tapers, each optical segment having separate electrodes for applying an electrical field to the electro-optical segment so that the phase speed of each mode coupled to the other wave guide can be corrected to superimpose with the other modes coupled thereto.

2. A mode transducer for converting modes of different orders but of the same polarization during coupling between a pair of optical wave guides, comprising a coupling taper with a coupling structure arranged between the pair of wave guides, said coupling taper having an input thickness and an output thickness with the ratio of the opening angle of the light at the input and the output of the taper being equal to the square of the ratio of the input thickness and the output thickness, and at least one additional taper and coupling structure, said additional taper and coupling structures being arranged in series with the first-mentioned taper and coupling structure so that a plurality of modes in one of the pair of wave guides are sequentially coupled into the other of said pair of wave guides, the coupling structure associated with each of the tapers being a directional coupler, each directional coupler being provided with an electro-optical segment having electrodes for applying an electrical field thereto so that the phase of each mode in each directional coupler can be changed for superimposing with the phase of the other modes being coupled to the other wave guide.

3. A coupling device for coupling modes of different orders but of the same polarization between a first and second optical wave guide, comprising a first optical wave guide, a second optical wave guide, and a mode transducer disposed between the first and second wave guides, said mode transducer including more than one taper arranged in series along a direction of light propagation therein and a coupling structure associated with each taper, each taper having an input end for receiving light and the associated coupling structure for coupling converted modes to the second wave guide, each taper having an input thickness and an output thickness with the ratio of the opening angle of the light at the input end to the opening angle of the light at the output end being equal to the square of the ratio of the input thickness and the output thickness, said second wave guide including a segment of electro-optical material for each taper, each segment having electrodes for applying an electrical field thereto so that the index of refraction of each segment can be changed to shift the phase of the mode coupled to the segment to enable an equal phase superimposition of the modes being converted by the tapers.

4. A coupling device for coupling modes of different orders but of the same polarization between a first and second optical wave guide, comprising a first optical wave guide, a second optical wave guide, and a mode transducer disposed between the first and second wave guides, said mode transducer including more than one taper arranged in series along a direction of light propagation therein, and a coupling structure associated with each taper, each taper having an input end for receiving light and the associated coupling structure for coupling converted modes to the second wave guide, each taper having an input thickness and an output thickness with the ratio of the opening angle of the light at the input end to the opening angle of the light at the output end being equal to the square of the ratio of the input thickness and the output thickness, the coupling structure associated with each of the tapers being a directional coupler, each directional coupler being provided with an electro-optical segment having electrodes for applying electrical field thereto so that the phase of each mode coupled into each directional coupler can be changed for superimposition with the other modes.

* * * * *